UNITED STATES PATENT OFFICE.

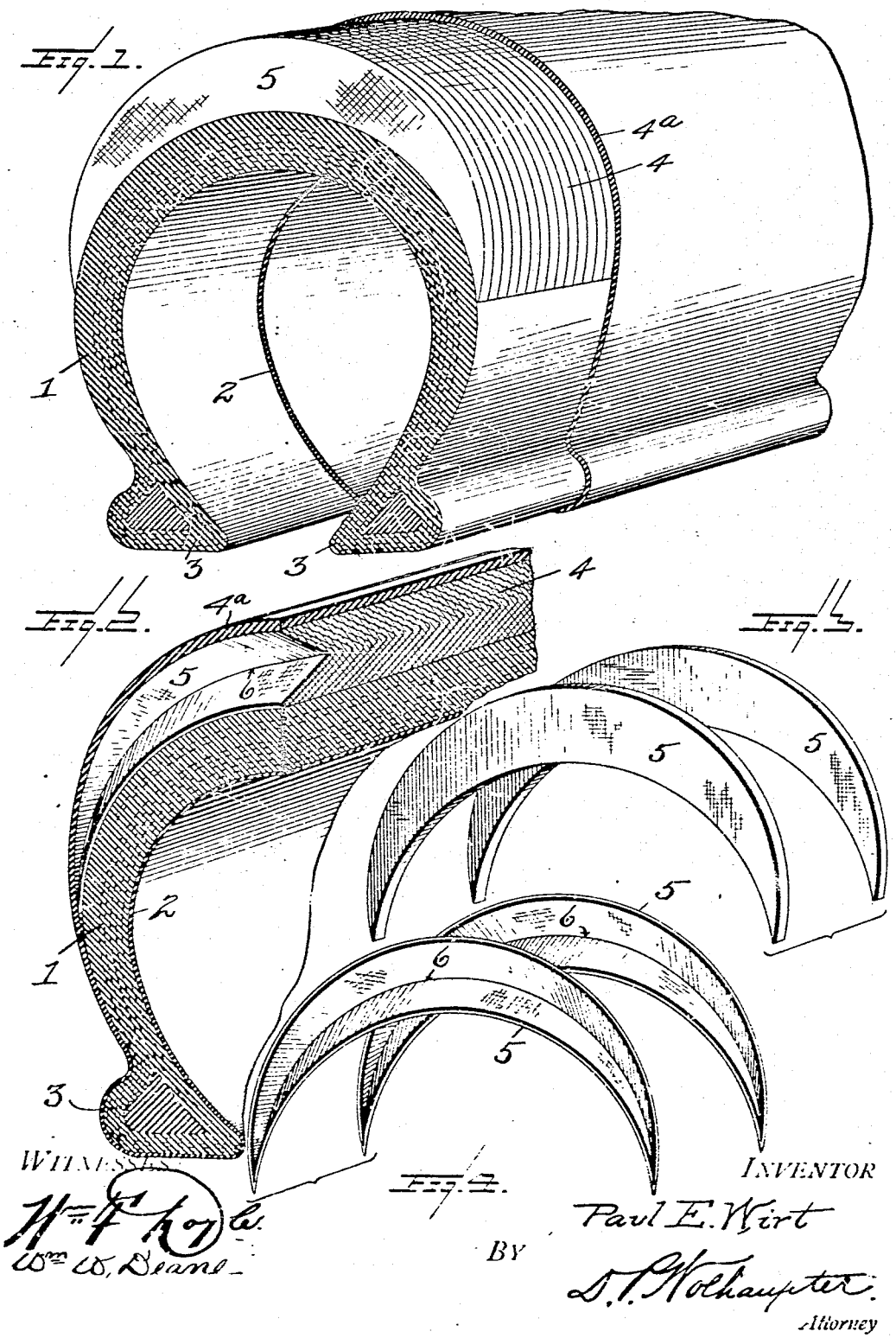

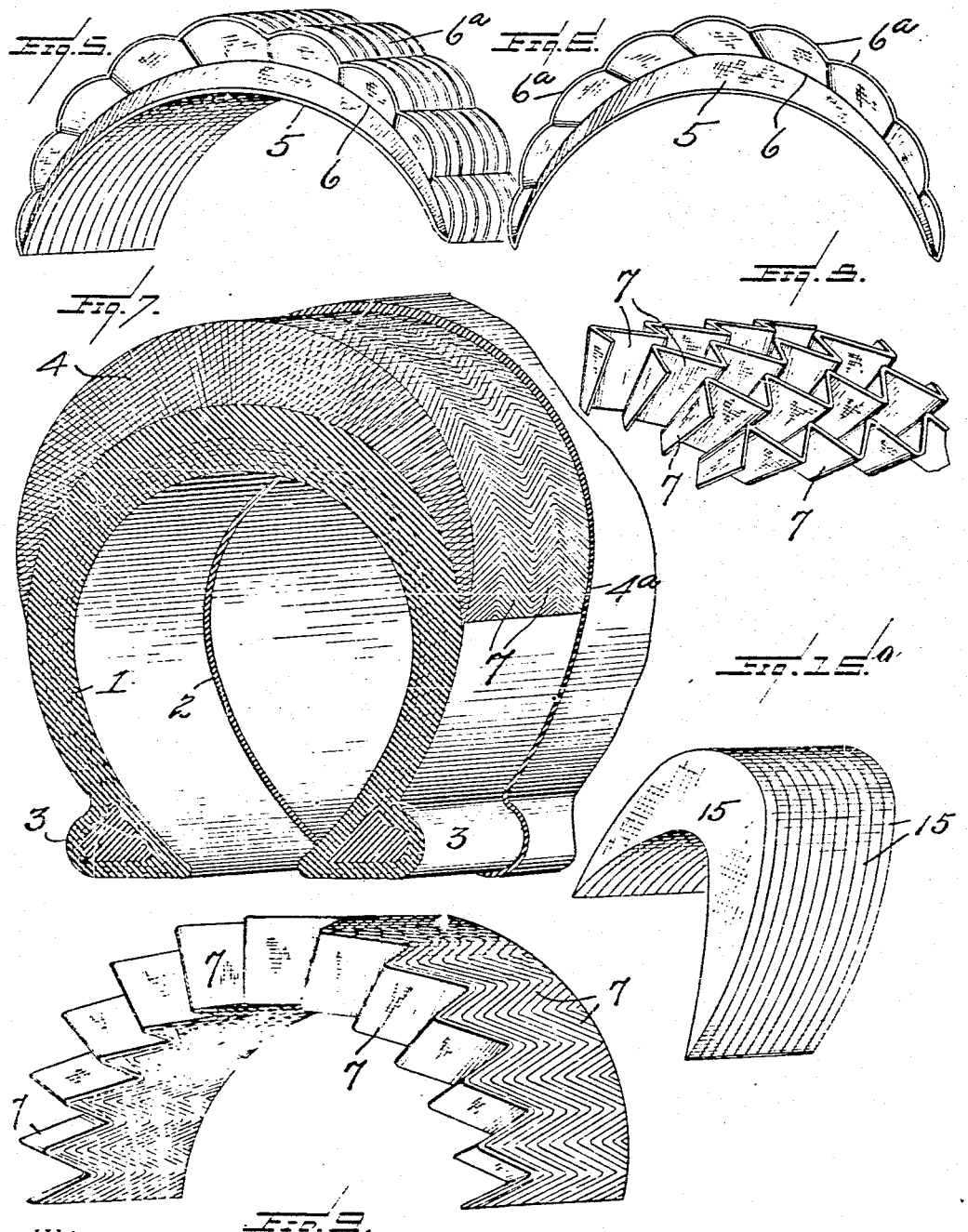

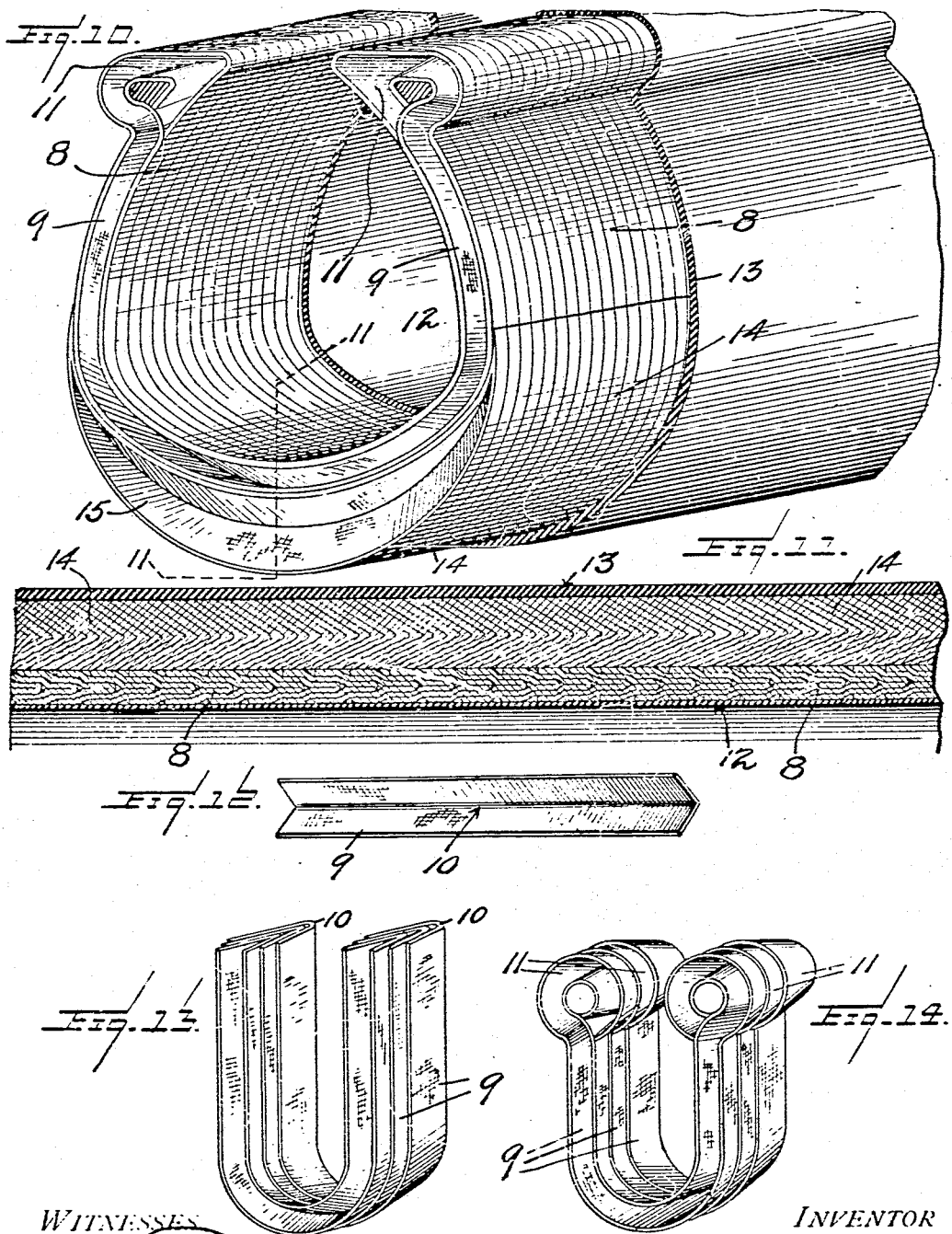

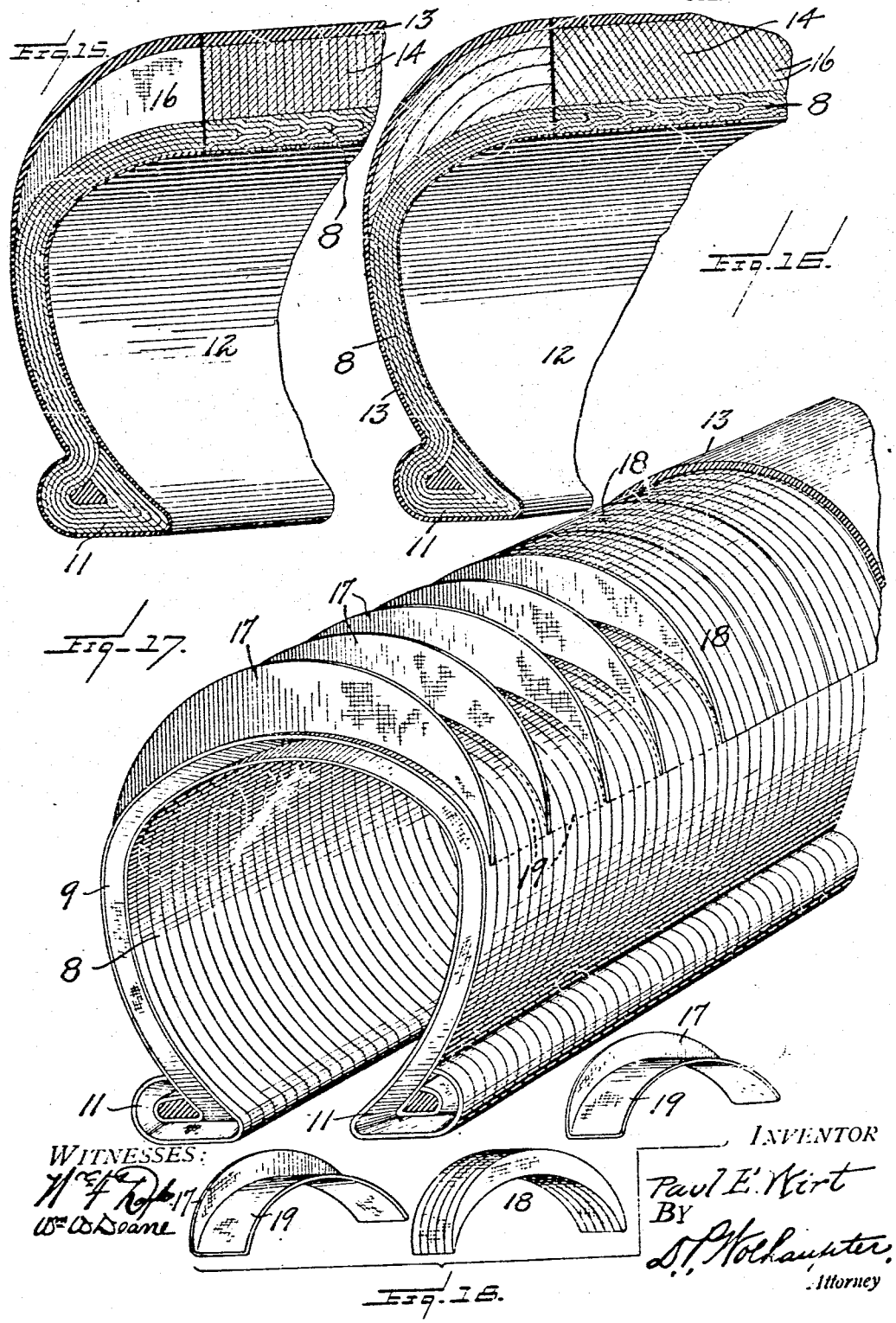

PAUL E. WIRT, OF BLOOMSBURG, PENNSYLVANIA.

TIRE AND TIRE-TREAD CONSTRUCTION.

951,870.　　　　　Specification of Letters Patent.　　Patented Mar. 15, 1910.

Application filed September 12, 1907. Serial No. 392,463.

*To all whom it may concern:*

Be it known that I, PAUL E. WIRT, a citizen of the United States, residing at Bloomsburg, in the county of Columbia and State of Pennsylvania, have invented certain new and useful Improvements in Tire and Tire-Tread Construction, (Case B,) of which the following is a specification.

This invention relates to the art of manufacturing tires for automobiles and other vehicles, and has special reference to an improved tread construction adapted for use in connection with the ordinary types of pneumatic tires, though possessing special utility as a structural part of a laminated tire construction of the character disclosed in a companion application filed of even date herewith and bearing Serial Number 392,462.

To this end the invention contemplates a simple and thoroughly practical laminated tread construction embodying great strength and wearing capacity, while at the same time having the necessary resiliency and flexibility, and serving to thoroughly protect the tire against the injuries which are common to most makes of tires in every day use.

As a general object, the invention has in view the provision of a tread structure which, when used with a tire of ordinary construction, or with a laminated tire of the type hereinafter fully described, provides a wearing tread for the tire having a maximum strength, integrity, resiliency, endurance, and yielding wearing face, together with a maximum resistance against perforations and other injuries.

With these and many other objects in view, which will more readily appear as the nature of the invention is better understood, the same consists in the novel construction, combination, and arrangement of parts hereinafter more fully described, illustrated, and claimed.

The essential features of the invention, involved in carrying out the objects above indicated, are necessarily susceptible to a wide range of structural modification without departing from the spirit or sacrificing any of the advantages of the invention, but certain practical embodiments thereof are shown in the accompanying drawings, in which—

Figure 1 is a sectional perspective view of a pneumatic tire of ordinary construction equipped with a supplemental laminated tread constructed in accordance with the present invention. Fig. 2 is a similar view showing the employment of tread forming-units of a modified design. Fig. 3 is a detail in perspective of a group of the tread forming-units such as employed in Fig. 1. Fig. 4 is a similar view of a group of the modified tread forming-units such as employed in the construction shown in Fig. 2. Fig. 5 is a perspective view of a section of laminated tread embodying another design of tread forming-units. Fig. 6 is a detail in perspective of one of the tread forming-units such as employed in the tread shown in Fig. 5. Fig. 7 is a sectional perspective view similar to Figs. 1 and 2 showing a further modification in the design and arrangement of the tread forming-units. Fig. 8 is a detail in perspective of a group of the tread forming-units such as employed in the construction shown in Fig. 7. Fig. 9 is a perspective view of a section of tread embodying tread forming-units of the design shown in Fig. 8, but arranged differently. Fig. 10 is a sectional perspective view of a laminated tire structure combined with a laminated tread such as contemplated by the present invention, showing one design of the tread forming-units. Fig. 11 is a detail sectional view on the line 11—11 of Fig. 10. Fig. 12 is a detail in perspective of a straight form of body forming-unit such as employed in the construction of the tire body shown in Figs. 10 and 11. Fig. 13 is a perspective view showing several of the body forming-units arranged in nested relation. Fig. 14 is a view similar to Fig. 13 showing how the nested forming-units are applied bent to shape around the mold or core upon which the whole tire is formed, and illustrating the ends of said units bent to provide clencher hook portions. Fig. 15 is a sectional perspective view showing the improved laminated body construction associated with a laminated tread having the tread forming-units disposed in true radial planes, that is, at right angles to the circumference. Fig. 16 is a view similar to Fig. 15 showing the tread forming-units set at an inclination and oblique to the radii of the tire, as per detail of Fig. 16ᵃ. Fig. 16ᵃ is a detail of tread units shown in Fig. 16. Fig. 17 is a sectional perspective view of a laminated tire body and a laminated tread showing a modification in the tread structure wherein certain of the tread members are provided with anchoring means held between the laminations, layers, or units of the tire body. Fig. 18 is a detail in perspective showing a group of the separate units used in building up the modified tread structure shown in Fig. 17.

Like references designate corresponding parts in the several figures of the drawings.

In all forms of the invention, the improved tread structure embodies in its organization a plurality of tread forming strips or leaves arranged transversely of the circumference of the tire, and disposed substantially edgewise to the radii thereof so as to present the edges of the tread laminæ toward the outer wearing surface. In this connection, the invention particularly contemplates the use of fabric tread forming-units, strips, or leaves, so that the fibrous ends of the material are not only presented toward the main wearing surface, but also will receive, embed, and thoroughly bind the outer rubber covering very much better than where rubber is vulcanized to a flat surface, as is ordinarily the case. Various embodiments of this idea may be carried out without affecting the invention, and as shown in Figs. 1, 2 and 7 of the drawings, the improved laminated tread or tread structure may be applied to a pneumatic tread body of any ordinary and conventional type. In these figures of the drawings, the tire body is designated by the numeral 1 and consists of the usual circumferential laminations of rubberized fabric and rubber, and having an inner rubber tube or casing 2, and at its edges provided with the clencher hook members 3, all of which is of the ordinary well known construction. As a protective tread for the tire body referred to, the present invention contemplates the employment of a laminated tread structure designated in its entirety by the reference number 4 covered by the rubber covering 4ᵃ, and composed of a continuous series of individual tread forming-units 5 arranged in compact side by side relation transversely to the circumference of the tire, and disposed substantially edgewise to the radii thereof. The individual tread forming-units 5 may be of any suitable material, but are preferably formed from pieces or strips of rubberized fabric. By reason of the arrangement of the tread forming-units transversely to the circumference of the tire, and substantially edgewise to the radii thereof, it will be obvious that the said strips are presented edgewise to the wearing surface of the tire. This general arrangement of the tread forming-strips may be preserved with various designs of strips, for instance as shown in Figs. 1 and 3 of the drawings, each tread forming-unit 5 consists of a single strip or piece of flexible material cut into crescent form so as to straddle the outer tread portion of the tire body, and as shown in Figs. 2 and 4 of the drawings, the said units may still preserve a general crescent shape in elevation, while at the same time being longitudinally creased or folded, as at 6, to produce a V-shaped cross section therefor, thereby making a design which admits of the tread forming-units being nested one within the other and having inclined sides, as plainly shown in Fig. 2 of the drawings. This construction is especially tough and resilient and renders the tread more proof against perforation. In such construction any perforating body would, of necessity, be compelled to enter the fabric of the units almost at right angles with their surfaces and travel through a great many thicknesses of material, which would, of course, be very difficult. It will also be observed that this condition is due to the fact that on account of the cross-sectional V-shape of the units 5, as shown in Fig. 2, such units, when laid on edge, set obliquely to the tire body.

A modification of the dished or cross sectional V-shaped units, is suggested in Figs. 5 and 6, which illustrate the feature of providing the units with corrugated outer edges 6ᵃ serving the important function of preventing skidding or slipping of the vehicle wheels. Again, in Figs. 7 and 8 of the drawings, the laminated tread structure is illustrated as being composed of a plurality of tread forming-units 7 longitudinally crimped throughout and arranged in closely nested relation, parallel with the circumference of the tire, that is, extending circumferentially of the tire body in contradistinction to transversely as hereinbefore referred to. It will be observed that in this construction the tread forming-units are crimped in a zigzag manner so that when the surface of the tread is presented to the ground by the wheel as it runs, there will be little likelihood of perforation, as the irregular or zigzag crease of each unit massed in the tread body will prevent any body from entering as quickly as if the units were straight throughout.

A modification of the tread shown in Figs. 7 and 8 is suggested in Fig. 9, that is, having the longitudinally crimped tread forming-units 7 closely nested in side by side parallel relation, but running over the tire body transversely to the circumference in the same relation as the transversely disposed treads of Figs. 1 to 6, inclusive.

The tread structure and its modifications, so far as described, have been shown as adapted to tires of ordinary construction, but the laminated tire structure possesses special utility in connection with a correspondingly laminated tire body, and a composite structure of this character is illustrated in the group of Figs. 10 to 18, inclusive.

Referring to the construction of tire and tire tread shown in Figs. 10 and 11 of the drawings, it will be observed that the tire body is similar in construction and function to the tire body disclosed in my aforesaid companion application filed of even date herewith. That is, the tire body, designated in its entirety by the number 8 in Figs. 10 and 11 of the drawings, is built up of a multiplicity of forming-strips or leaves arranged transversely to the circumference of the tire and so disposed as to present the edges of the body laminæ toward the outer wearing surface of the tire. In other words, the laminated tire body 8 shown in Figs. 10 and 11 has the tread forming-units thereof so arranged that the same are disposed edgewise to the body of the tire so that they run with the edges substantially turned to the road, thereby securing a resiliency, evenness, and durability as to wear that far excels the usual thick rubber cushion. As indicated, the said body 8 is made of built up or laid in layers of individual body forming-units, each of which units preferably consists of a straight strip 9 of rubberized fabric or equivalent material bent into the necessary form to admit of the laying in or building up process. An individual tread forming-unit 9 is shown in Fig. 12 of the drawings. It may be observed that this unit may consist of a straight strip of material longitudinally creased or folded along the longitudinal center line 10, as indicated in said figure, to produce a unit having a V-shape in cross section, and also having flat straight sides. The units thus formed are designed to be successively nested in compact side by side relation and are bent about a forming mandrel or mold into the annular form indicated in Fig. 13 of the drawings and are finally bent into the completed tire or tube shape shown in Fig. 14, which figure also illustrates the terminals of the units bent to provide the clencher hook members 11. The laying in or nesting of the units 9 is carried on successively until a complete tire body in the shape shown in Fig. 10 is made, and by reason of the flat sides of the units being compressed into overlapping relation, it will be obvious that in cross section the laminations will so closely hug each other as to present a V-shaped form, as plainly shown in the sectional view of Fig. 11 of the drawings. The tire wall shown in Fig. 11 presents such a number of thicknesses and laminations, and in such relation as to secure great strength and resisting qualities, while at the same time being so thoroughly flexible and resilient as to adapt itself to the regular conditions.

In the laminated tire body construction described, the inner and outer rubber casings or coverings 12 and 13 are employed and vulcanized or cemented directly upon the inner and outer edges of the laminations constituting the body 8, but the present invention preferably contemplates associating with the laminated tire body a supplemental tread structure 14 made up of a multiplicity of tread forming-units of any of the designs shown in any of the other figures of the drawings. However, for illustrative purposes, there is shown in Figs. 10 and 11 of the drawings a tread structure 14 built up from flexible tread forming-units or strips 15 of the crescent, dished, design shown in Figs. 2 and 4 of the drawings, and arranged in side by side nested relation transversely to the circumference of the tire, and disposed edgewise to the radii thereof, thereby presenting the outer fibrous edges of the tread forming-units 15 toward the wearing surface of the tire body, and as the bonding surface for the outer relatively thin rubber covering 15. Also it will be observed that since the units 15 shown in Figs. 10 and 11 are of the same cross-sectional form as the units shown in Fig. 2, the said units 15 when laid on edge necessarily preserve an oblique disposition to the tire body. As suggested in Fig. 15 of the drawings, the tread structure may be composed of a series of plain, crescent shaped tread forming-units 16 similar in construction and arrangement to the units 5 shown in Figs. 1 and 3, and if found desirable or preferable, these tread forming-units 16 may be set at an angle and obliquely to the circumference and radii of the tire, as suggested in Fig. 16 of the drawings. The oblique arrangement of the units 16 corresponds in principle and in function to the oblique disposition of the units 5 and 15, shown respectively in Fig. 2, and in Figs. 10 and 11.

Another phase of the invention is illustrated in Figs. 17 and 18 of the drawings. In these figures there is shown combined with a laminated tire body 8 of the general construction shown in Figs 10 and 11, a tread structure made up of a succession of compactly laid tread forming-units 17 and 18, respectively. The tread forming-units 17 are provided at their bottom edges with anchoring aprons 19 inserted and secured between the units or laminations of the tire body 8, while the other tread forming-units 18 are of a non-flanged construction and are packed in the intervals between the upstanding tread forming portions of the units 17. This construction secures additional strength and durability, and a firmer adherence of the separate tread structure to the tire body, although it will be understood that in all of the tread constructions it is contemplated that they be firmly vulcanized under firm pressure so as to be held thereto as an intimate or integral part thereof. The principle of construction involved in the modification shown in Figs. 17 and 18 may obviously be carried out in connection with tread units of different designs, and arranged on true radial lines, and obliquely, so long as the idea is preserved of presenting their outer edges as the wearing surface of the tire. In connection with the construction shown in Figs. 10, 15, 16, and 17, it will be obvious that the same possesses many structural advantages which are of practical importance.

When a composite tread structure is combined with a composite body structure, as suggested in Figs. 10, 11, 15, and 16, a tire of great durability is provided, and the said tire possesses many advantages which are not possible of attainment with the ordinary tire structures. In addition to those advantages already pointed out for the structure just referred to, it may be further observed at this point that by reason of the arrangement of the body forming-units transversely to the circumference of the tire, and hence, the overlapping laminations upon the exterior surface thereof, there will be little or no opportunity for what is known as "sand blisters." This is particularly true of certain forms of construction shown in my companion application aforesaid, but it is likewise true with the laminated body structure disclosed in the present application.

In the ordinary tire, when the rubber exterior is cut, it often occurs that sand is forced continuously into the cut as the wheel revolves, and is driven along the face of the fabric between the outer rubber covering and the inner fabric, thus loosening the rubber covering and causing what is known as the "sand blister," which, if not removed from time to time, eventually destroys the tire, and in the ordinary tire construction a tear or perforation may be put through one or more thicknesses of the fabric and sand pounded into, under or between the layers of fabric, causing an early destruction.

In the improved laminated tire structure claimed herein, even though the surface were abraded or cut, the sand could not be forced between the leaves, because the fold or inclination at which the fabric is laid is backward. Should sand be driven into the perforation, through the outer rubber covering and under it, it would find no continuous space for accumulation, such as occurs in the ordinary tire construction, because the overlapping leaves run away from the impact upon the ground, and moreover, which is of great importance, the outer soft rubber exterior covering when applied and vulcanized upon the fabric of the improved tire herein shown, is held or cemented more firmly than that upon the ordinary construction of tire. So many edges and ends of thread of the fabric are presented to the rubber in covering that the latter adheres with a great deal of tenacity. The rubber covering in the improved tire claimed embeds itself and vulcanizes down, in and about so many of the ends of the threads of the fabric, in addition to whatever flat surfaces remain exposed, that great adherence is attained, and sand forced into a cut by the running wheel can find no such weakness in the bond between the outer rubber cover and fabric as is of necessity, and must be, in the present day construction of tire. It is much more difficult to get rubber to adhere strongly to the flat surface of fabric. It will be observed that nearly the whole of the exterior surface of this fabric construction presents an almost solid mass of fabric thread ends into which rubber may embed and adhere, to a much greater extent than where rubber covering is applied to the hard, tight, comparatively smooth surface of canvas of fabric, as in the present method of construction.

Referring again to sand or dirt blisters "under the skin" of the tire, and consequent "blow outs," it may be said that should a cut occur in the surface of the improved tread or tire, the wear or impact of the tire upon the road as in running has a most positive tendency to beat down the ends of fiber about, around, over and into such cuts so as to fill or stop up any threatened further opening of the cut. This cannot occur in the present form or make of treads or tires, while on the contrary, where cuts are made, they spread wider or increase in size. A cut on the thick rubber tread of the usual tire will, owing to the nature of soft rubber, distended by pneumatic pressure from within, under most circumstances, increase or spread apart. It is this tendency of the rounded distended body of rubber of the ordinary pneumatic tire tread to widen because of inherent tension that causes much of the tire difficulty and tire destruction.

In the improved construction claimed, the tendency is for the body of the substantially vertical tread to resist widening of accidental cuts or abrasions. The tendency is, as stated, owing to the manner of construction, and the compression of the numerous layers—particularly of the tread—when an opening or cut is made to cling or contract around and about such cut, particularly does such chance opening contract or fill up as the tire revolves upon the road beating down the fibrous ends of the threads at, within, and about the rent.

The improved tire claimed is particularly amenable to treatment when it comes to the repairs of cuts upon its surface. The usual rubber cement applied within or between the laminations and fibrous ends of a broken surface, will be held or so confined and bound, as to render adhesion certain, and so durably cement the injured parts with absolute certainty.

In the average usual tire, repairs are of very uncertain permanency owing to the fact that where the rubber covering is severed from the fabric foundation, the surfaces within the tear are hard, smooth and without interstitial character enough to insure permanent adhesion.

In the improved construction claimed, the ends of the threads of fabric, the close lying, clinging, closing and binding surfaces, receive and retain cement permanently, thus insuring the closest and most permanent relation and repair.

Various changes in the form, proportion, and minor details of construction may be resorted to without departing from the spirit or sacrificing any of the advantages of the invention.

I claim:

1. In a tire, the tire body and a separate tread portion on the latter, said tread portion consisting of a plurality of thin flexible forming units constructed from sheet-material and adhesively compacted in face to face relation with their outer edges presented toward the wearing surface.

2. A tire comprising a body portion and a separate tread portion on the latter, said tread portion consisting of a plurality of thin flexible forming units constructed from rubberized fabric, said forming units being adhesively compacted in face to face relation with their outer edges presented toward the wearing surface, and an outer rubber covering bonded onto said outer edges of the units.

3. A tire comprising a body portion and a separately built up tread thereon, said tread consisting of rubberized sheets of fabric cut to predetermined length and shape and laid on edge upon the body to present the outer edges of all of the sheets toward the wearing surface, said fabric sheets being laid up on the body successively in face to face contact and vulcanized together on and with the body.

4. A tire comprising a body and a separately built up tread thereon, said tread consisting of thin flexible forming units constructed from sheet material and laid on edge oblique to the body.

5. A tire comprising a body and a separately built up tread thereon, said tread consisting of a plurality of rubberized flexible forming units laid on edge and set obliquely to the radii of the tire body.

6. A tire comprising a body and a separately built up tread thereon, said tread consisting of a plurality of thin rubberized fabric sheets laid on edge upon the body and disposed obliquely to the circumference and radii of the latter.

7. A tire comprising a body and a separately built up tread thereon, said tread consisting of a plurality of flexible rubberized fabric sheets adhesively compacted in face to face relation and laid on edge upon the body with their outer edges presented toward the wearing surface, said outer edge portions of the fabric sheets bearing an overlapping relation.

8. A tire comprising a body and a separately built up tread thereon, said tread consisting of a plurality of flexible fabric sheets adhesively compacted in face to face relation and laid on edge with their outer edges presented toward the wearing surface, said fabric sheets being set obliquely and bearing an overlapping relation, and an outer rubber covering bonded onto the outer edges of said sheets.

9. A tire including a body and a tread secured to the body and comprising units, the outer margins of which have an oblique edgewise disposition to the body.

10. In a tire, the tire body, and a laminated tread vulcanized upon the body and composed of folded flexible nested forming-units.

11. In a tire, the tire body, and a laminated tread built astride and secured to the outer surface of the tire body and composed of folded flexible nested forming-units.

12. In a tire, the tire body, and a laminated tread built astride and vulcanized to the outer surface of the tire body and composed of folded flexible rubberized nested forming-units.

13. In a tire, the tire body, a laminated tread built astride and bonded to the outer surface of the tire body and composed of closely compacted and folded flexible rubberized nested forming-units, and an outer rubber covering bonded onto the compacted units.

14. In a tire, the tire body, and a laminated tread built upon and secured to said body and composed of folded flexible forming-units compactly nested in side by side relation and disposed edgewise to the tire body and also oblique thereto.

15. In a tire, the tire body, and a laminated tread composed of folded flexible forming-units having an oblique edgewise disposition relative to the tire body.

16. In a tire, the tire body, and a laminated tread composed of folded flexible nested forming-units having an oblique edgewise disposition relative to the tire body.

17. In a tire, the tire body, and a laminated tread built astride the tire body and composed of compacted flexible nested forming-units each consisting of a strip of crescent form having a V-shape in cross section.

In testimony whereof I hereunto affix my signature in the presence of two witnesses.

PAUL E. WIRT.

Witnesses:
C. W. FUNSTON,
R. L. ORANGE.